United States Patent [19]

Yokota

[11] Patent Number: 5,335,124
[45] Date of Patent: Aug. 2, 1994

[54] DISK DRIVE

[75] Inventor: Yuji Yokota, Chichibu, Japan

[73] Assignee: Canon Denshi Kabushiki Kaisha, Chichibu, Japan

[21] Appl. No.: 128,567

[22] Filed: Sep. 29, 1993

Related U.S. Application Data

[63] Continuation of Ser. No. 734,224, Jul. 22, 1991, abandoned.

[30] Foreign Application Priority Data

Jul. 23, 1990 [JP] Japan ................................. 2-194297
Feb. 5, 1991 [JP] Japan ................................. 2-035491

[51] Int. Cl.$^5$ ............................................. G11B 17/04
[52] U.S. Cl. ................... 360/99.06; 360/99.02; 360/99.07
[58] Field of Search ............... 360/99.06, 99.02, 99.12, 360/99.07, 97.01; 369/75.2, 77.1, 77.2

[56] References Cited

U.S. PATENT DOCUMENTS

| | | |
|---|---|---|
| 4,604,666 | 8/1986 | Kitahara et al. ................ 360/99.06 |
| 4,688,125 | 8/1987 | Nomoto et al. |
| 4,766,510 | 8/1988 | Okita et al. |
| 4,805,054 | 2/1989 | Kamoto et al. |
| 4,959,740 | 9/1990 | Nishikawa |
| 5,126,899 | 6/1992 | Kanazawa ..................... 360/99.06 |

FOREIGN PATENT DOCUMENTS

161680 6/1990 Japan.

OTHER PUBLICATIONS

U.S. Application Ser. No. 07/913,747, filed Jul. 16th, 1992.
U.S. Application Ser. No. 07/921,438, filed Jul. 31st, 1992.

*Primary Examiner*—David P. Porta
*Attorney, Agent, or Firm*—Spencer, Frank & Schneider

[57] ABSTRACT

A disk drive for recording data to and/or reproducing data from a disk includes a disk cassette guide and a slide plate. The disk cassette guide supports the disk during installation or removal of the disk to or from the disk drive. The slide plate has engage or upright portions which engage the disk cassette guide so as to move the disk cassette guide in response to the installation or the removal of the disk. The engage portions are disposed in concave portions formed at the side walls of the disk cassette guide. On each side of the disk drive, the outer surface of the side wall of the disk cassette guide is substantially coplanar with the outer surface of a side wall of the slide plate.

22 Claims, 23 Drawing Sheets

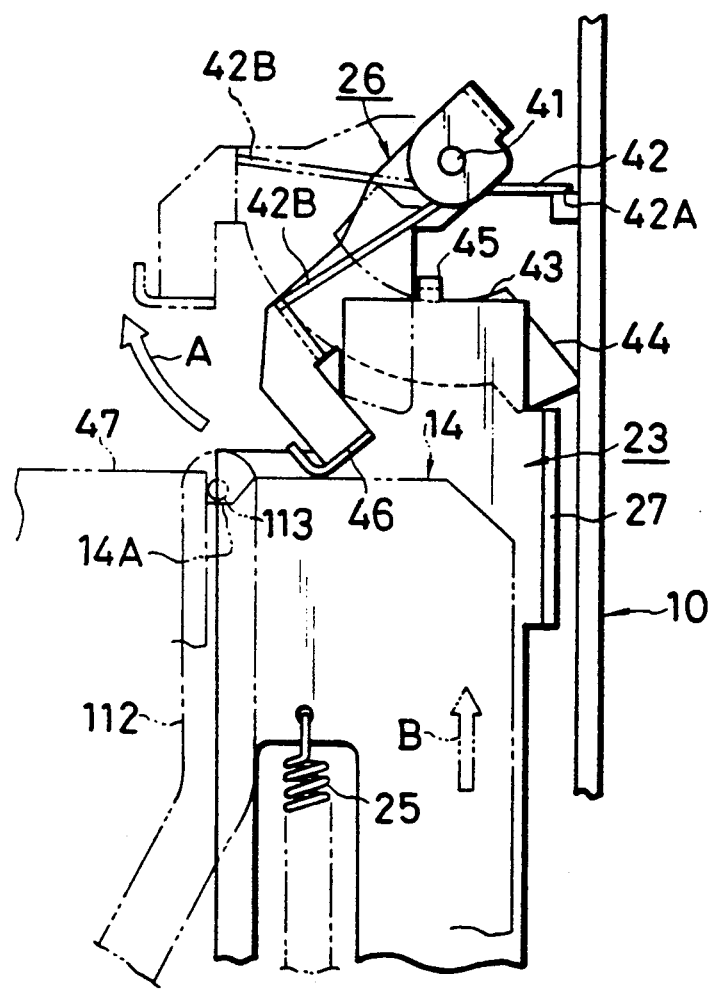
F I G. 10

DISK DRIVE

This application is a continuation of application Ser. No. 07/734,224, filed Jul. 22, 1991 now abandoned.

BACKGROUND OF THE INVENTION

1. Field of The Invention

The present invention relates to a disk drive for recording to or reproducing from a disk, and particularly to a disk drive used as an external storage device for electronic apparatuses such as personal computers, word processors or the like.

2. Description of The Prior Art

Disk drives carry out recording to or reproducing from disk-shaped recording media such as magnetic disks, laser disks or the like. The disk drive is constructed so as to perform recording to or reproducing from a disk as follows: A disk, the recording medium, is inserted into the disk drive; the disk is rotated by a driving motor; heads are brought into contact with or made to approach the surface of the disk; and writing data into or reading data out of the disk is carried out with the head moving relative to the disk. The heads are mounted on a carriage which is moved by a driving motor, so that the heads are moved on the disk in the radial direction (seek operation). An example of a disk drive is shown in Japanese Patent Application Laying-open No. 161,680/1990 (U.S. Ser. No. 07/392,045).

The disk drive comprises a base that supports the component parts of the disk drive, an installation and removal means for installing or removing the disk, a disk rotation drive means for rotating the disk by the motor, a head seek means for moving heads on the disk in the radial direction to place the heads on a target track, and a head loading means for loading or unloading the head to or from the disk, and the like. In addition, a control circuit for controlling the entire disk drive is provided, along with a connector for a power supply. The control circuit is connected to a host computer system via an interface so that the control circuit receives data from and supplies data to the host computer system.

In general, the installation and removal means has a cassette guide that supports a disk cassette in which the disk is housed, and guides the disk cassette into the disk drive so as to install it on the disk rotation drive means. The cassette guide also guides the disk cassette out of the disk drive so as to remove it from the disk rotation drive means. The installation and removal means also includes a slide plate that has a cam portion which engages a part of the cassette guide to lower or raise it, and is movable in directions in which the disk cassette is installed or removed. A latch member that controls ejection of the disk cassette in response to the movement of the slide plate is also included in the installation and removal means. The disk drive has a shutter opening means for opening a shutter of the disk cassette by engaging the shutter when the disk cassette is installed in the disk drive. The shutter opening means has an arrangement in which the latch member functions as an engaging member which engages the shutter or an arrangement in which an engaging member is rotatably supported on the cassette guide and can engage the shutter.

The components of the disk drive described above are housed in the base, which is shaped like a box having an opening which is closed by a cover for dustproofing and magnetic shielding.

When such disk drives are used as external storage devices for electronic apparatuses such as personal computers or word processors, they are sometimes constructed as independent apparatuses. In general, however, they are incorporated into the main bodies of the electronic apparatuses. As the electronic apparatuses become smaller and more portable, reducing the size and weight of the disk drives and increasing their portability is increasingly desirable.

In the conventional disk drive, the cam portion of the slide plate is provided at an upright portion, which overlaps with an outer surface of a side wall of the cassette guide. As a result, the base for housing the components of the disk drive needs extra space for the overlapping of the upright portion with the outer surface of the side wall of the cassette guide. This presents the problem that the width of the disk drive becomes relatively large. Additionally, in the conventional disk drive, the cam mechanism for raising or lowering the cassette guide is disposed in substantially the same horizontal plane in which the disk cassette is placed. This also makes it hard to reduce the size of the disk drive.

SUMMARY OF THE INVENTION

It is an object of the present invention to reduce the width of the disk drive by restricting the width of the cassette guide and the slide plate or the like.

In a first aspect of the present invention, a disk drive for recording data to and/or reproducing data from a disk comprises:

a guide member for supporting the disk during installation or removal of the disk to or from the disk drive; and a slide member having an engage portion which engages the guide member so as to move the guide member in response to the installation or the removal of the disk, with the engage portion being disposed in a concave portion formed at the wall of the guide member;

wherein an outer surface of the side wall of the guide member is substantially coplanar with an outer surface of the side wall of said slide member.

In a second aspect of the present invention, a disk drive for recording data to and/or reproducing data from a disk comprises:

a guide member for supporting the disk during installation or removal of the disk to or from the disk drive;

a slide member having an engage portion which engages the guide member so as to move the guide member in response to the installation or the removal of the disk, with the engage portion being disposed in a concave portion formed at a side wall of the guide member; and a case member, a side portion of which is disposed in a concave portion formed at a side wall of the guide member.

In a third aspect of the present invention, a disk drive for recording data to and/or reproducing data from a disk comprises:

a guide member for supporting the disk during installation or removal of the disk to or from the disk drive; and a slide member having an engage portion which engages the guide member so as to move the guide member in response to the installation or the removal of the disk, with the engage portion engaging the guide member at a top portion of the guide member.

The above and other objects, effects, features and advantages of the present invention will become more apparent from the following description of embodiments thereof taken in conjunction with the accompanying drawings.

BRIEF DESCRIPTION OF THE DRAWINGS

FIGS. 10 and 11 are partial plan views respectively showing a latch state and a non-latch state of the latch member of FIG. 4;

DETAILED DESCRIPTION OF PREFERRED EMBODIMENTS

Figure 1:
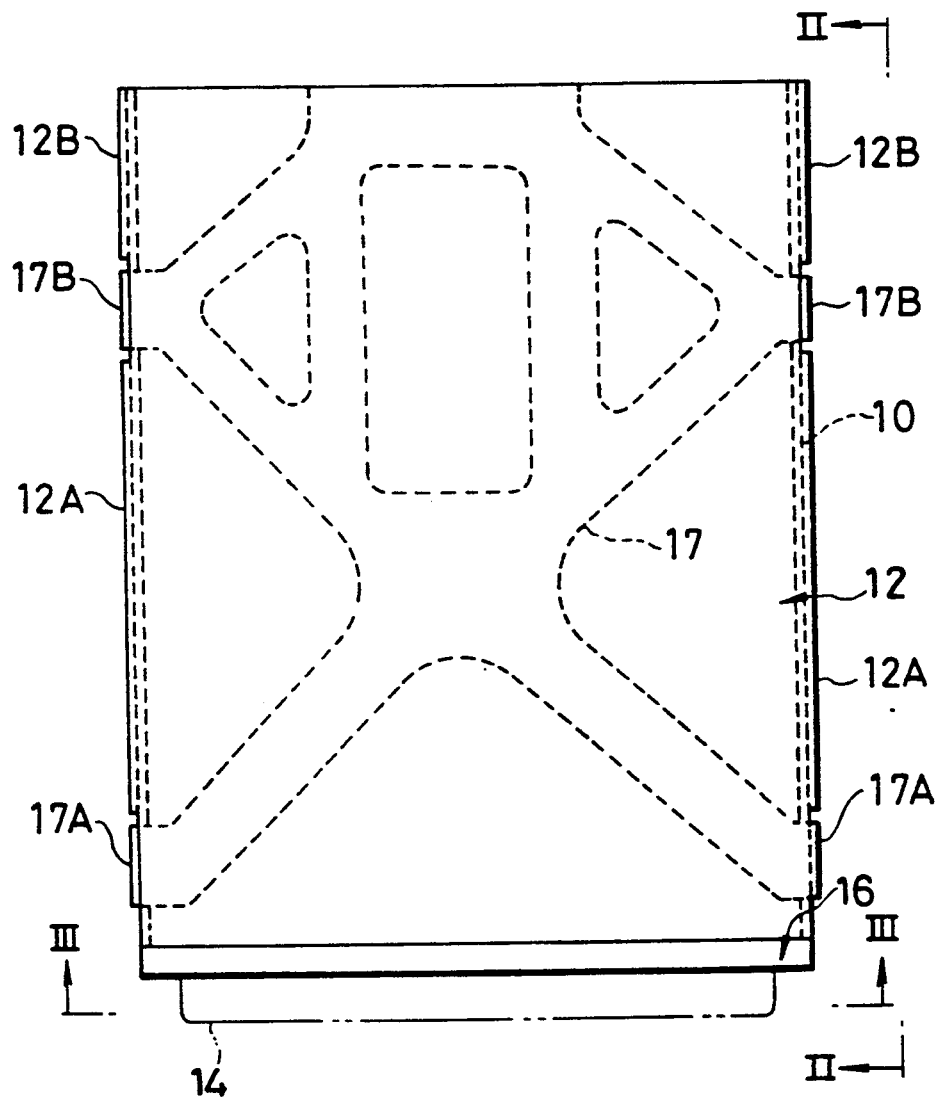
FIG. 1 is a top plan view of an embodiment of a disk drive in accordance with the present invention.

The invention will now be described with reference to the accompanying drawings, in which the same reference numerals designate the same or corresponding parts. First, an example of the entire structure of a disk drive to which plan view of an embodiment of the disk drive, FIG. 2 is a right side view taken along the line II—II of FIG. 1, and FIG. 3 is a front view take along the line III—III of FIG. 1.

Figure 2:
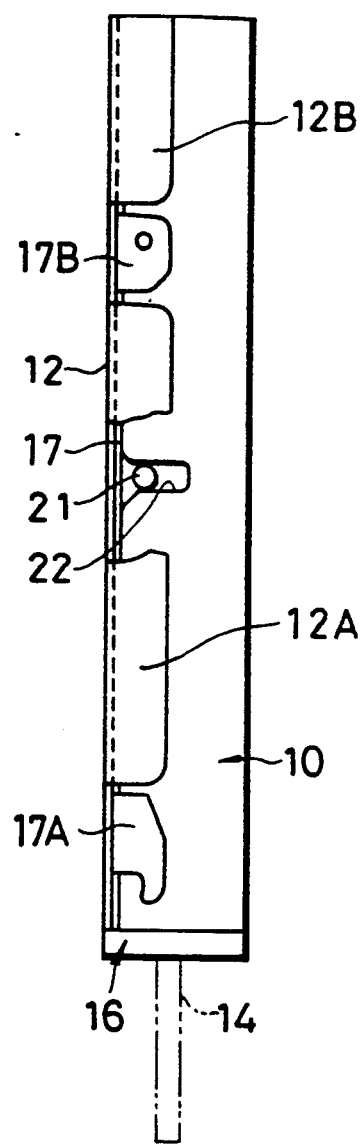
FIG. 2 is a right side view taken along the line II—II of FIG. 1.
Figure 3:
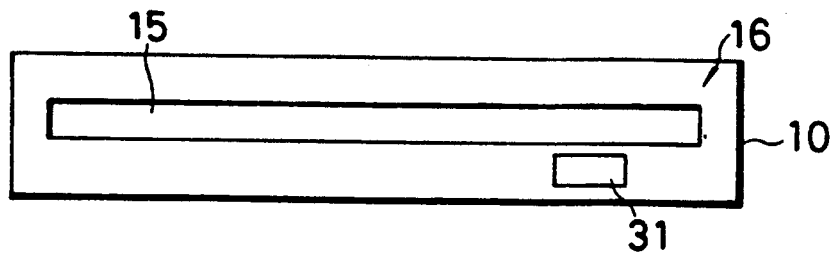
FIG. 3 is a front view taken along the line III—III of FIG. 1.

In FIGS. 1-3, the disk drive has a case which is composed of a base 10 shaped like a box with the top and the front open, and a cover 12 and a front panel 16 which cover these openings. The top open portion of the base 10 is provided with a reinforcing member 17, and the cover 12 is disposed over the reinforcing member 17. Bent portions 17A and 17B are formed at both sides of the reinforcing member 17 and are screwed to the side faces of the base 10, so that the reinforcing member 17 is fixed to the base 10. As a result, the rigidity of the base 10 is ensured. The cover 12 also has bent portions 12A and 12B, which are fixed to the sides of the base 10.

The base 10 and the reinforcing member 17, for example, are made of metal plates such as aluminum. The cover 12, which functions as a shield against magnetism and dust, is made of a thin plate of nonmagnetic material such as aluminum. At the front of the base 10, there is provided a front panel 16 having a cassette insertion aperture 15. A disk cassette 14 can be inserted or ejected through aperture 15.

Each of the components of the disk drive that are housed in the case described above will be described below.

Figure 4:
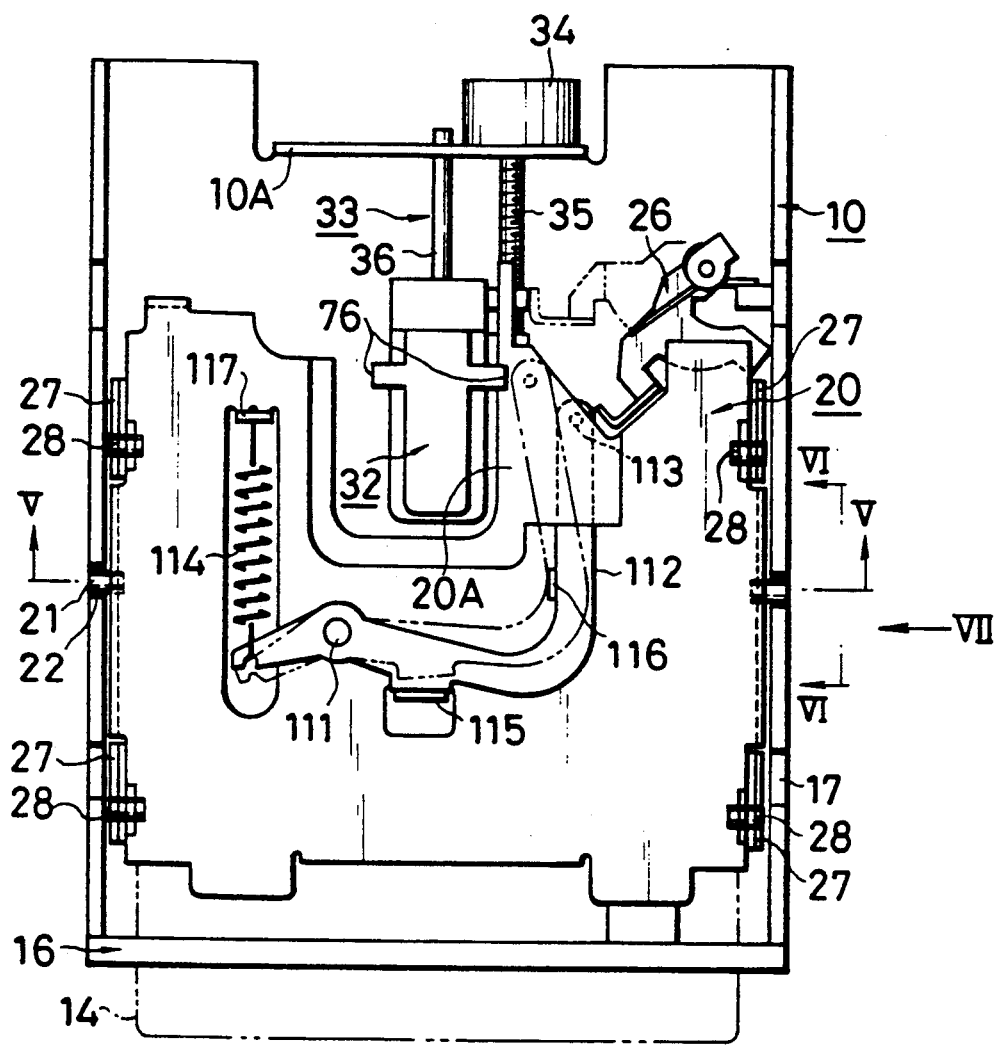
FIG. 4 is a plan view showing the disk drive of FIG. 1 with its cover removed.
Figure 5:
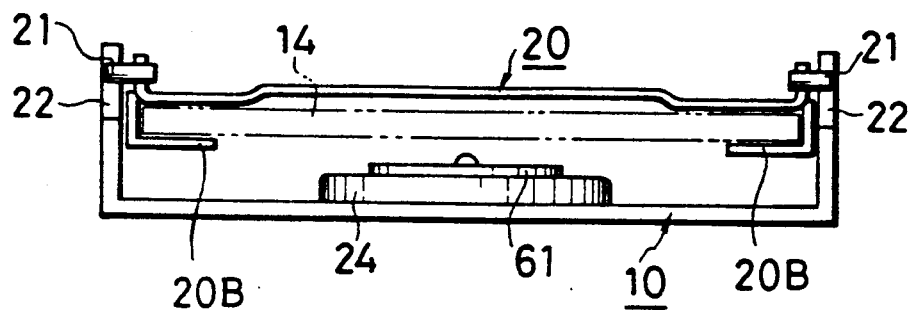
FIG. 5 is a cross sectional view taken along the line V—V of FIG. 4.
Figure 6:
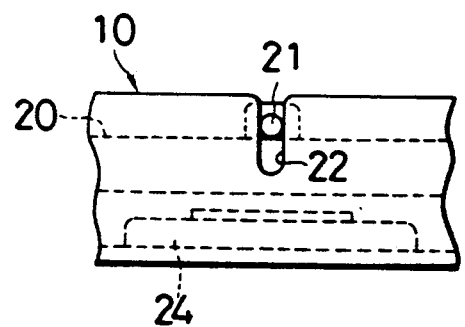
FIG. 6 is a partial side view taken along the line VI—VI of FIG. 4.

FIG. 4 is a plan view showing the disk drive with its cover 12 and reinforcing member 17 removed. FIG. 5 is a cross sectional view taken along the line V—V of FIG. 4, showing the base 10 and the cassette guide 20. FIG. 6 is a side view of a portion of the disk drive taken along the line VI—VI of FIG. 4. In FIGS. 4, 5 and 6, a cassette guide 20 can be raised or lowered (in directions perpendicular to the plane of FIG. 4) with respect to the base 10, so that the cassette guide 20 can guide the disk cassette 14 during insertion into or ejection from the disk drive and so that it can also guide the loading and unloading of the disk cassette 14 to a motor 24.

Figure 7:
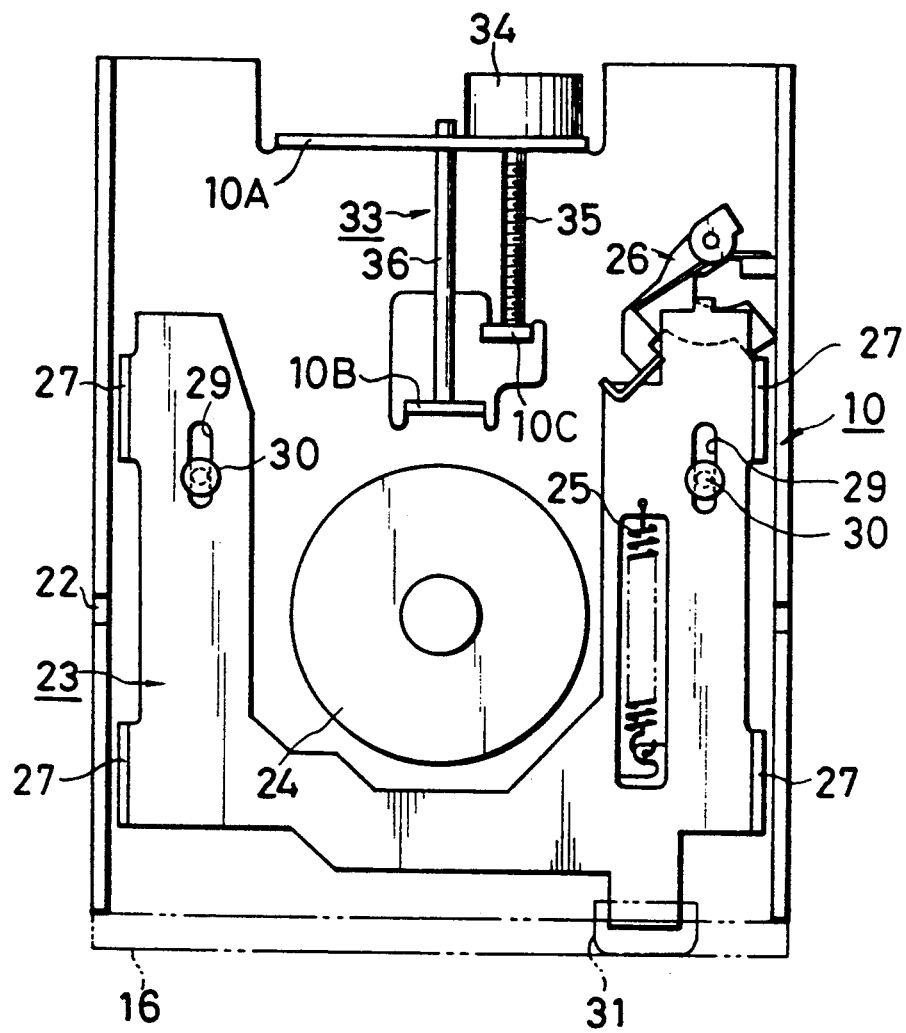
FIG. 7 is a plan view showing the disk drive of FIG. 4 with the cassette guide removed therefrom.

The cassette guide 20 has a holder 20B shown in FIG. 5 to guide and hold the disk cassette 14, and has guide pins 21 on both sides thereof. The base 10, on the other hand, has, on both sides, slots 22 in which the guide pins 21 of the cassette guide 20 slidingly fit. Slots 22 are elongated in the direction perpendicular to the bottom plane of the base 10. Thus, the cassette guide 20 is attached to the base 10 in such a manner that it can move up or down along the slots 22 in a predetermined range. The cassette guide 20 has cam pins 28 at its four corners. Each of the cam pins 28 engages with a cam slot formed at each of the upright portions provided at four corners of a slide plate which is shown in FIG. 7 and which will be described later. Thus, movement of the cassette guide 20 relative to the slide plate can be produced when the cassette 14 is inserted or ejected. The cassette guide 20 moves up and down with regard to the base 10 during this relative movement.

A vertical pin 111 attached to the top surface of the cassette guide 20 rotatably pivots a shutter lever 112. The shutter lever 112, interlocking with the insertion or the ejection of the disk cassette 14, opens or closes the shutter 47 (of FIG. 10) of the head accepting openings of the disk cassette 14. A shutter pin 113 which engages the end edge of the shutter 47 projects from the lower side of one end of shutter lever 112. The other end of the shutter lever 112 is pulled clockwise in FIG. 4 by a spring 114, one end of which is supported by a spring supporting portion 117 which projects from the upper surface of the cassette guide 20. A stopper 115 is formed on the cassette guide 20 for restricting the cassette non-loading position of the shutter lever 112, and a stopper 116 is provided on the shutter lever 112 for limiting the cassette installing position at which the head accepting aperture is opened. In this arrangement, the shutter lever 112 can swing between the two positions, that is, between the cassette non-loading position shown by solid lines and the cassette loading position shown by phantom lines. Incidentally the end of the shutter lever 112 from which the shutter pin 113 projects is covered with a cover 20A which is formed on the cassette guide 20.

FIG. 7 is a plan view showing the disk drive of FIG. 4 with the cassette guide 20 removed therefrom. In FIG. 7, under the cassette guide 20, a slide plate 23 has engage or upright portions 27 provided at four corners thereof. Each upright portion 27 has a cam slot as described above so that the slide plate 23 restricts the lateral motion (left to right or right to left direction in FIG. 7) of the cassette guide 20 as well as raises or lowers the cassette guide 20. The slide plate 23 is mounted in the base 10 in such a manner that it can slide in the directions (back or forth direction) in which the disk cassette 14 is inserted or ejected.

A disk shaped disk drive motor 24 is disposed near the center of the bottom of the base 10, and the slide plate 23 has a cutout at the center thereof so as to avoid interference with the disk drive motor 24. The slide plate 23 is supported by a plurality of (four, for example) projections (not shown) formed on the base 10 to support the bottom of the slide plate. Slots 29 are formed at two positions, namely, at right hand and left hand positions of the slide plate 23, to receive headed pins 30 attached to the base 10. As a result, the slide plate 23 can slide in the back or forth direction in a predetermined range, with its upward movement (in the direction normal to the paper of FIG. 7) being restricted. The slide plate 23 is normally pulled forward (toward the front panel 16) by a pulling spring 25 extending between the slide plate 23 and a member formed on the bottom of the base 10. On the other hand, the slide plate 23 can engage with a latch member 26 (which will be described later), and when latched, the slide plate 23 is held at the back position (the position as shown in FIG. 7) against the force of the pulling spring 25.

As described above, the upright portions 27 are formed at two (back end and front end) portions of each side of the slide plate 23 (for a total of four positions) to regulate the lateral position of the cassette guide 20. The upright portions 27 have cam portions (cam slots) 65 (see FIGS. 8 and 9) for raising and lowering the cassette guide 20, and at the same time for specifying the position in the back and forth direction of the slide plate 23 in response to the vertical position of the cassette guide 20.

The motions of the cassette guide 20 and the slide plate 23 relative to each other, in relation to the cam slots 65, will be described with reference to FIGS. 8 and 9.

Figure 8:
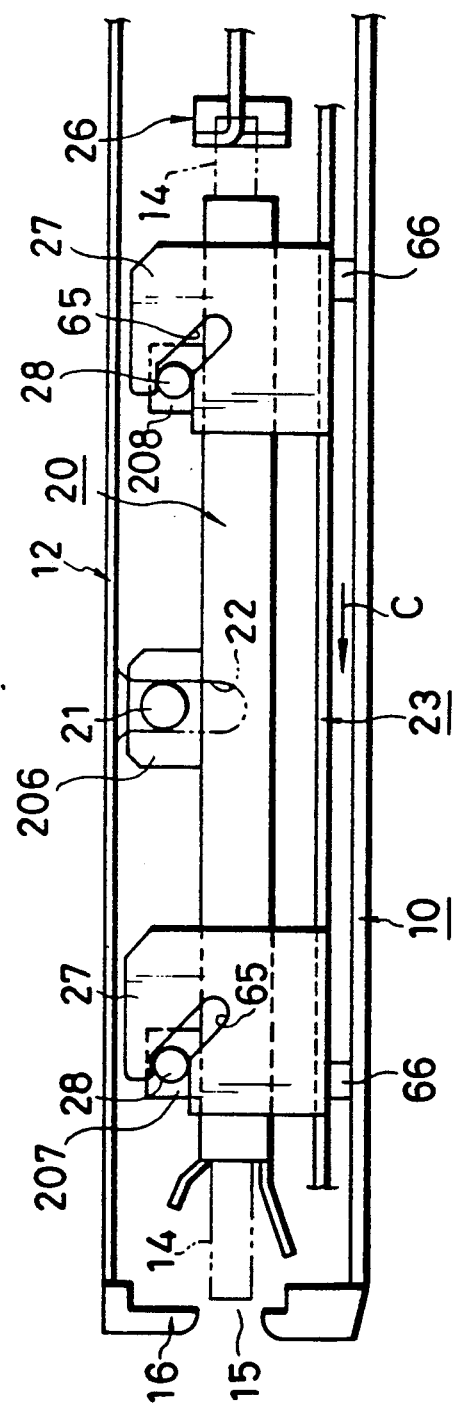
FIG. 8 is a sectional side view showing the disk drive of FIG. 4 with the cassette guide elevated.
Figure 9:
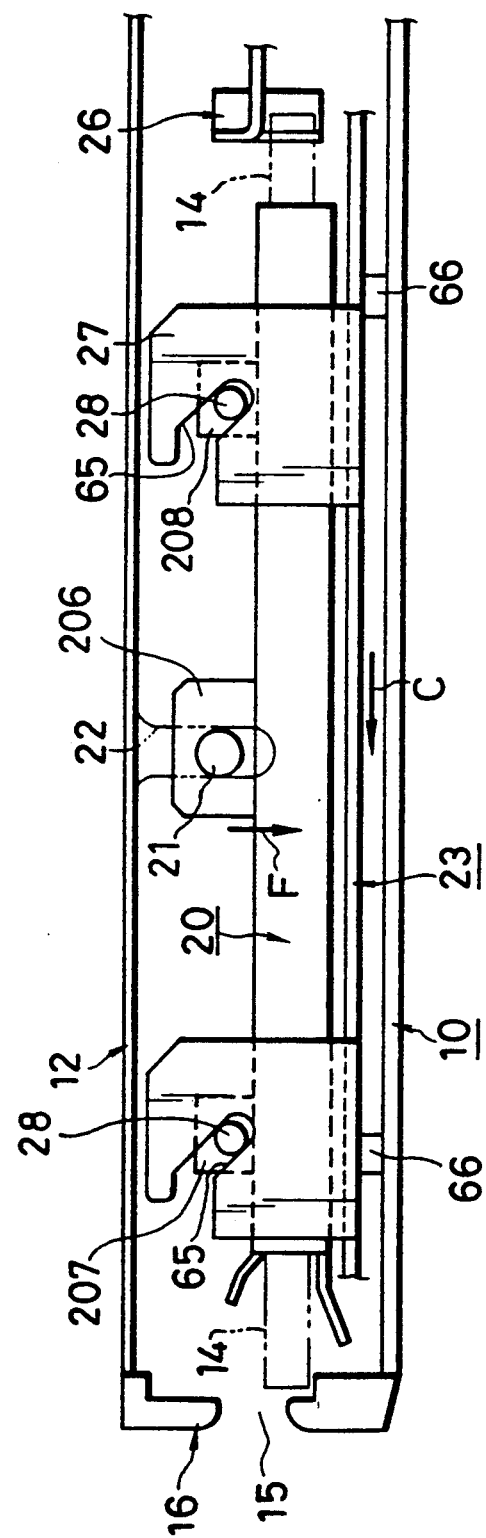
FIG. 9 is a sectional side view showing the disk drive of FIG. 4 with the cassette guide lowered.

FIGS. 8 and 9 are side views taken along the arrow VII of FIG. 4, showing the relative motion of the cassette guide 20 to the slide plate 23; FIG. 8 illustrates the raised state of the cassette guide 20 in which the disk cassette 14 is not housed in cassette guide 20 or is in the course of insertion; and FIG. 9 illustrates the lowered state of the cassette guide 20 in which the disk cassette 14 is housed.

In FIGS. 8 and 9, the cam slots 65 are formed in the upright portions 27 disposed on each side of the slide plate 23. Each cam slot 65 consists of a horizontal slot portion formed at the front side (the front panel side), and a sloping slot portion extending from the horizontal slot portion toward the back of the upright portion 27. Each cam slot 65 receives one of the cam pins 28 which are provided on each side of the cassette guide 20. The guide pins 21 provided at the center of each side of the cassette guide 20 fit into the slots 22 of a predetermined length which are formed on both sides of the base 10 and are shown by phantom lines. Thus, the cassette guide 20 can move only up and down relative to the base 10.

In the state shown in FIG. 8, when the disk cassette 14 is inserted through the cassette insertion aperture 15 in the front panel 16 and is pushed to the inner part of the disk drive, as will be described hereinafter with reference to FIGS. 10 and 11, the latch member 26 engages the front edge of the disk cassette 14 in response to the pushing of the disk cassette 14. The latch member 26 turns clockwise and disengages the slide plate 23. As a result, the slide plate 23 is moved in the direction of arrow C in FIGS. 8 and 9 (toward the front panel 16) by the pulling spring 25. In accordance with this motion, the cam pins 28 are guided downward by the cam slots 65, thereby lowering the cassette guide 20 to the cassette loaded position as shown in FIG. 9. With this series of the motions, a disk housed in the disk cassette 14 is loaded on the rotor of the motor 24.

In this case, the forward stop position of the slide plate 23 (see FIG. 9) is determined by the shape of the cam slots 65 because the lowered position of the guide cassette 20 is restricted, and the cam slots 65 engage with the cam pins 28. Incidentally, reference numeral 66 in FIGS. 8 and 9 designates projections provided at a plurality of positions on the base 10 for slidably supporting the slide plate 23.

The disk cassette 14 is ejected by pushing an ejection button 31 shown in FIG. 7. This pushes the slide plate 23 backward. This pushing produces a different engagement of the slide plate 23 with the latch member 26 so that the latch member 26 rotates counterclockwise, and the slide plate 23 is latched at the back position (pushed position). With the counterclockwise rotation of the latch member 26, the pushing arm thereof pushes the disk cassette 14 forward to eject it.

Referring to FIGS. 4 and 7 again, a head seek means (a head moving means) 33 is provided in the base 10. The head seek means 33 is a mechanism for moving a head unit 32, which includes recording and reproducing heads, in the radial direction of a disk which is loaded and positioned on the drive motor 24 so that the heads are placed on a desired track. A head loading means for loading the heads on or unloading the heads from the disk, as will be described later, is provided in the head unit 32. The head seek means 33 is composed of a driving motor (a stepper motor, for example) 34, a lead screw 35 for converting the rotational movement of the motor 34 to radial movement of the head unit 32, a guide bar 36 for correctly guiding the radial movement of the head unit 32, etc. The lead screw 35 and the guide bar 36 are supported by upright portions 10A, 10B and 10C formed by cutting the bottom plate of the base 10. Incidentally, the head unit 32 is not illustrated in FIG. 7.

FIG. 10 is a partial plan view showing a major portion of the latch mechanism in the non-loaded state of a disk cassette, or in the latch state in which the latch member 26 is in engagement with the slide plate 23. FIG. 11 is a partial plan view showing the same portion as in FIG. 10 in the loaded state of the cassette disk, or in the non-latch state in which the slide plate 23 is released. FIG. 12 is a side view of the portion shown in FIG. 11. The motion of the slide plate 23 and the latch member 26 will be described with reference to FIGS. 10–12.

The latch member 26 is rotatably mounted on a vertical pin 41 attached to the bottom of the base 10, and is normally pressed counterclockwise in FIG. 10 by an ejector spring 42. One end 42A of ejector spring 42 is fixed to a fixed member provided on a side surface of the base 10, and the other end 42B is fixed to a predetermined portion of the latch member 26 in such a manner that the spring 42 winds the pin 41. Thus, the pressing force can act on the latch member 26. The latch member 26 has a curved engaging edge 43 and a sliding edge (stopper edge) 44 that turns approximately in a longitudinal direction (back-and-forth direction in FIG. 11) in the non-latch state. In the latch state shown in FIG. 10, an engaging portion (a downward portion) 45 formed on the slide plate 23 fits at the engaging edge 43, and hence the slide plate 23 is held at the back position against the force of the pulling spring 25. The latch member 26 is further provided with an ejection arm 46 that makes contact with the front portion of the disk in cassette 14. The ejection arm 46 functions, when ejecting the cassette 14, as an ejector for expelling the disk cassette 14 with the force produced by the ejector spring 42.

When the disk cassette 14 is inserted in the latch state as shown in FIG. 10 (in the direction of the arrow B), the front portion of the cassette 14 makes contact with the ejection arm 46. As the cassette is further inserted, the latch member 26 rotates in the direction of the arrow A against the force of the ejection spring 42, and thus, the engaging edge 43 of the latch member 26 slips out of the engaging portion 45 of the slide plate 23 and the engaging portion 45 engages the sliding edge 44. Thus, the slide plate 23 moves in the direction of the arrow C with the force of the pulling spring 25, thereby resulting in the cassette loaded state or non-latch state as shown in FIG. 11. In this state, the rotational position of the latch member 26 is held by the engagement of the engaging portion 45 with the sliding edge 44.

With the insertion of the disk cassette 14, the shutter 47 of the disk cassette 14 is simultaneously opened. More specifically, when the disk cassette 14 is inserted, a shutter pin 113 on the shutter lever 112 fits on the edge of the shutter 47 as well as fits a slide portion 14A formed at the front edge of the disk cassette 14 (as shown in FIG. 10). As the disk cassette 14 advances further, the shutter pin 113 slides left on the slide portion 14A and pushes the shutter 47. In accordance with this slide, the shutter lever 112 rotates counterclockwise, and hence the shutter 47 begins to open against the force of a spring which is provided in the disk cassette 14. Thus, when the cassette is placed at the loaded position as shown in FIG. 11, the head accepting aperture is entirely open. Once the head accepting aperture is open, head loading becomes possible as will be described later: The heads in the head unit 32 are pressed (or placed close) to the disk so that writing data into or reading data out of the disk becomes possible.

Figure 11:
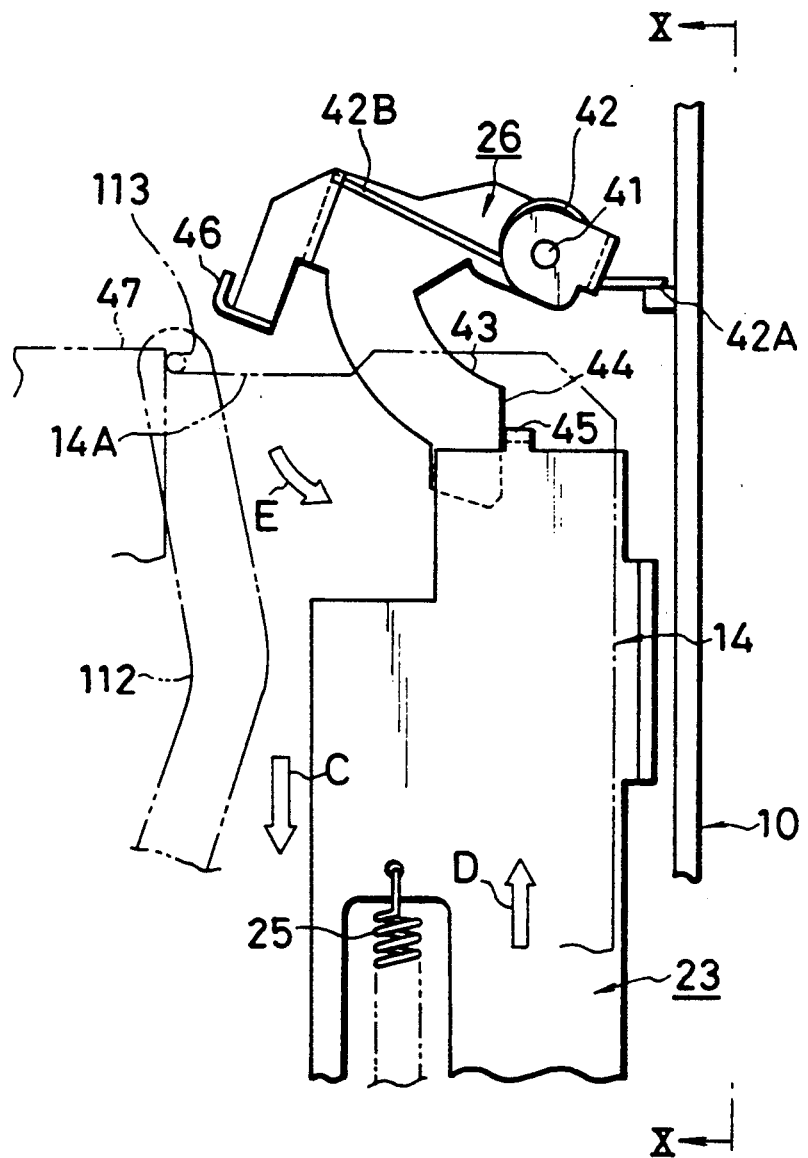
Figure 12:
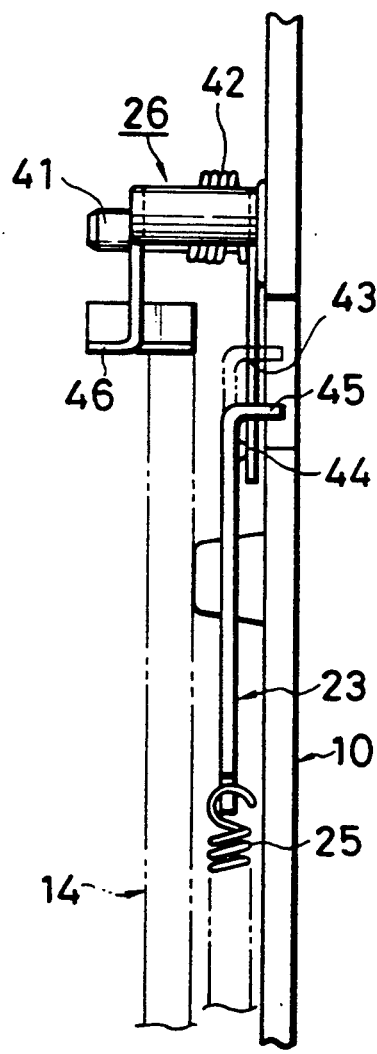
FIG. 12 is a side view taken along the line X—X of FIG. 11.

On the other hand, when the disk cassette is to be ejected, the eject button 31 in FIG. 7 is depressed and the slide plate 23 is pushed in the direction of the arrow D of FIG. 11. As a result, the engaging portion 45 separates from the sliding edge 44 of the latch member 26 and engages the engaging edge 43. Thus, the latch member 26 is turned by the force of the ejector spring 42 in the direction of the arrow E in FIG. 11, and hence the disk cassette 14 is ejected forward by the advancing force of the pushing arm 46 of the latch member 26. In this case, the shutter 47 of the disk cassette 14 separates from the shutter lever 112 in accordance with the ejection of the cassette, and automatically returns to its normal position with the force of the spring so as to close the head accepting aperture. At the same time, the engaging edge 43 of the latch member 26 fits on the engaging portion 45 of the slide plate 23 so that the slide plate 23 is held at the back position. Accordingly, as shown in FIG. 8, the cassette guide 20 is maintained at the raised position, and one of the heads is also held at an elevated position (the unloaded position) with the cassette guide 20 as will be described later with reference to FIG. 18.

Figure 13:
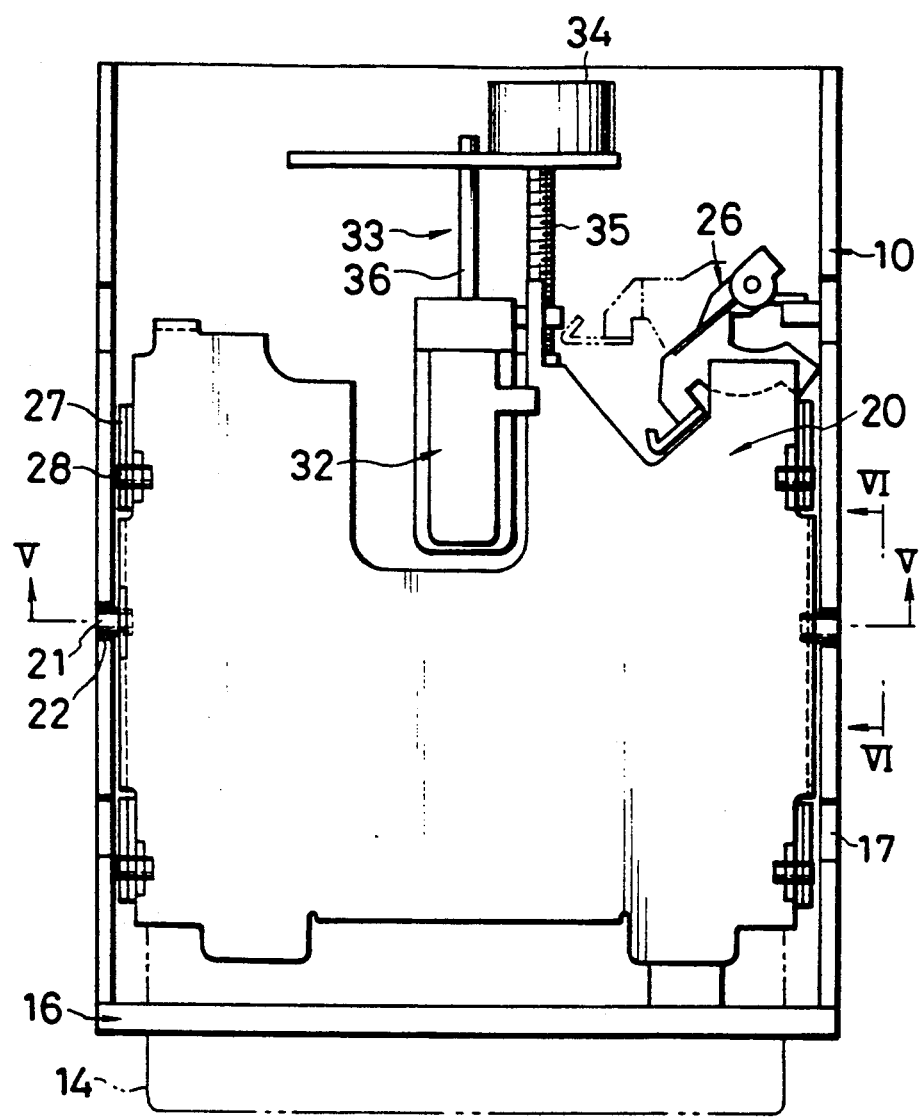
FIG. 13 is a plan view showing the disk drive of another embodiment of the present invention with its cover removed.
Figure 14:
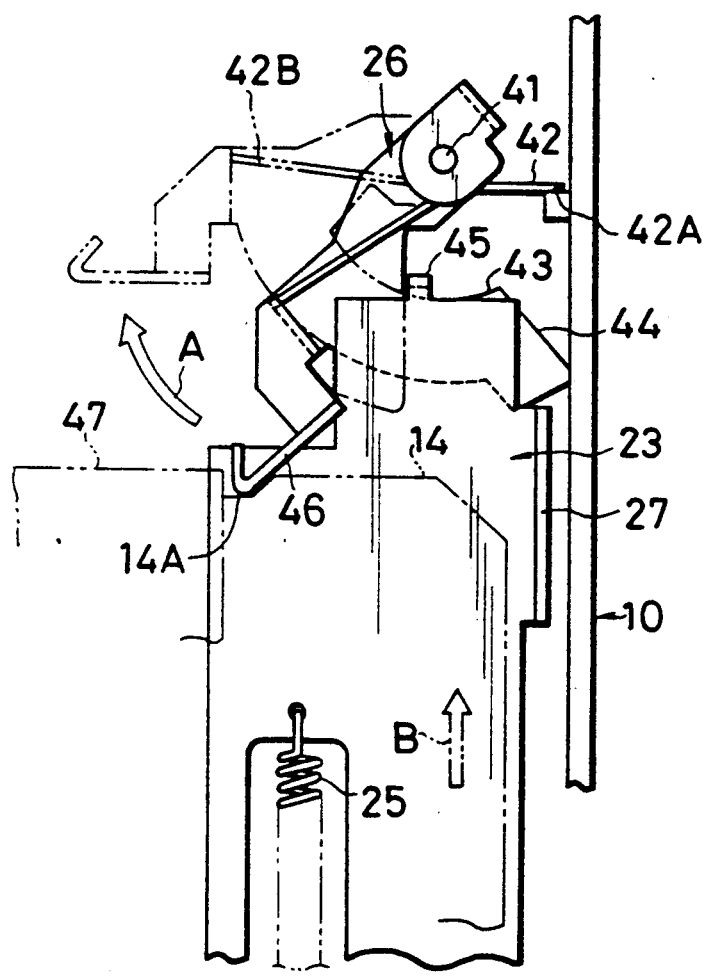
FIGS. 14 and 15 are partial plan views respectively showing the latch state and the non-latch state of the latch member of FIG. 13.
Figure 15:
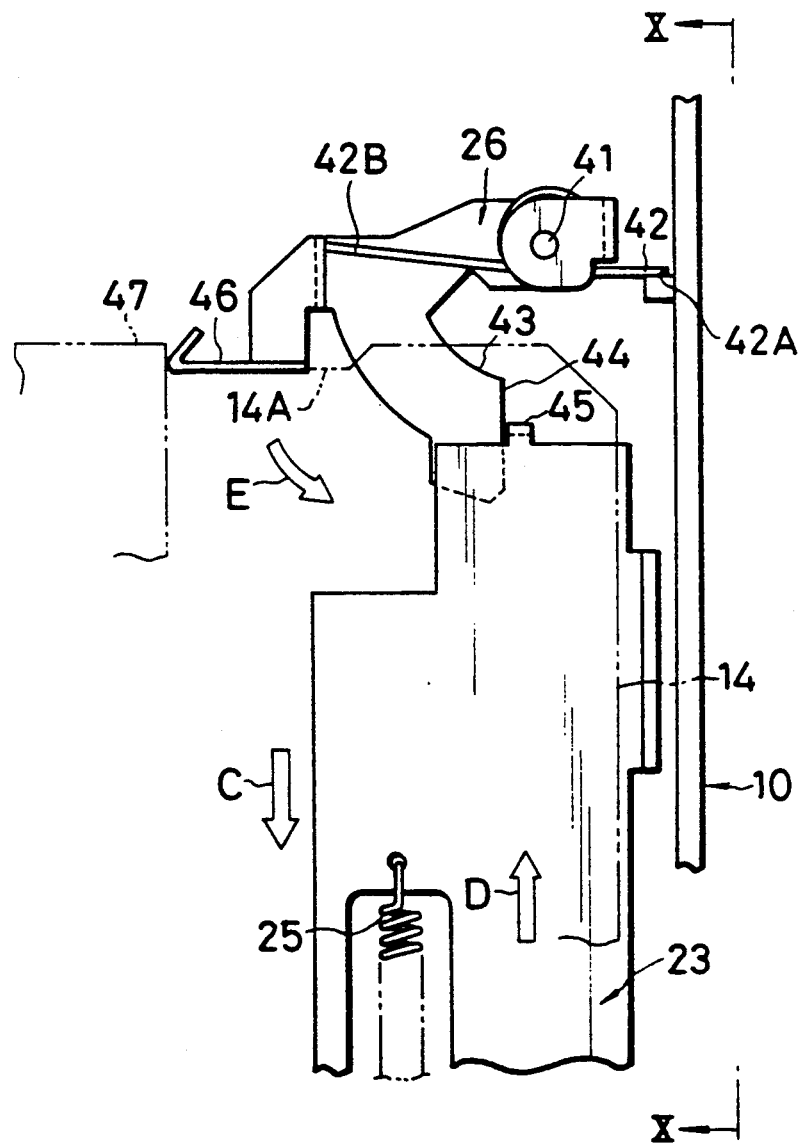

FIGS. 13, 14 and 15 are views for explaining another arrangement for opening and closing the shutter 47 of the disk cassette 14. These Figures correspond to FIGS. 4, 10 and 11, respectively.

This arrangement excludes the shutter lever 112 and the components associated therewith as shown in FIG. 13. More specifically, when the disk cassette 14 is inserted, the ejection arm 46 of the latch member 26 directly engages the slide portion 14A of the disk cassette 14. As the disk cassette 14 is further pressed forward in the direction indicated by the arrow B in FIG. 14, the latch member 26, rotating in the direction indicated by the arrow A in FIG. 14, slides on the sliding portion 14A, thereby opening the shutter 47. The rotation of the latch member 26 terminates when the engaging portion 45 of the slide plate 23 releases the engagement with the engaging edge 43 of the latch member 26, and then encounters the slide edge 44. As a result, the shutter 47 is kept open as shown in FIG. 15.

Figure 16:
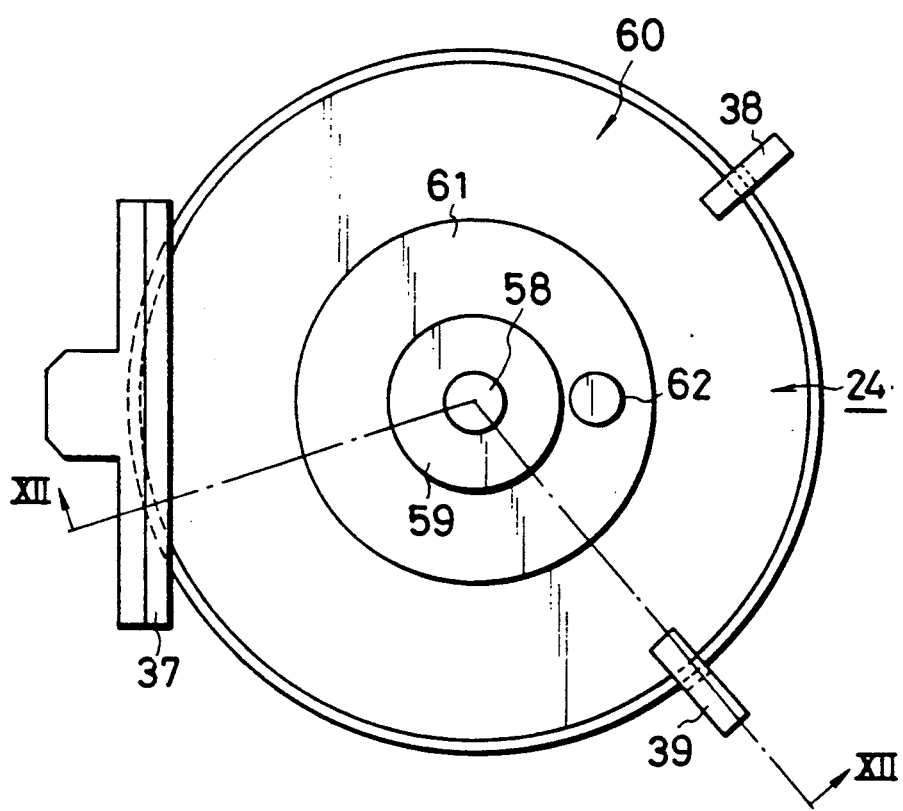
FIG. 16 is a plan view showing the motor of FIG. 7 for driving the disk.
Figure 17:
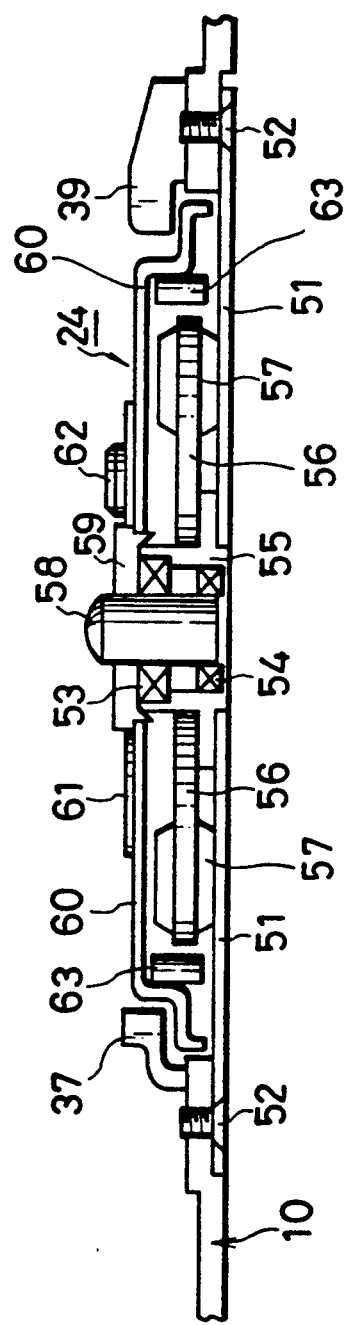
FIG. 17 is a longitudinal sectional view of the motor taken along the line XII—XII of FIG. 16.

FIG. 16 is a plan view showing the motor 24 for driving the disk (the recording medium) in the disk cassette 14, and FIG. 17 is a longitudinal sectional view of the motor taken along the line XII—XII of FIG. 16. A flat motor of the circumference facing outer rotor type is used as the disk drive motor 24. The motor 24 is mounted on the bottom of the base 10.

In FIGS. 16 and 17, a stator yoke 51 is fixed to the bottom of the base 10 with screws 52. On the stator yoke 51 are mounted stator side component parts, such as a bearing housing 55 that holds bearings 53 and 54, a stator 56, a coil 57, etc. The bearings 53 and 54 support a spindle shaft 58. On the spindle shaft 58 are mounted rotor side components parts such as a disk-like outer rotor 60 which is mounted on the shaft via a flange 59, an attracting magnet 61 for fixing the disk on the rotor, a disk drive pin 62 on the attracting magnet 61, and drive magnets 63 fixed inside the rotor 60 so as to face the stator 56.

Furthermore, on the bottom of the base 10, stoppers 37, 38 and 39 for preventing the rotor from moving upward along the shaft are fastened with screws or the like. The stoppers 37, 38 and 39 also serve to prevent the bottom surface of the disk cassette 14 from contacting the rotor 60 owing to the warp of the bottom surface in the disk cassette loaded state. Alternatively, the stoppers 37, 38 and 39 can be formed on the base 10 in one body with the base- In the loaded state of the disk cassette 14, the magnetic body (not shown) provided at the center of the disk is attracted to the attracting magnet 61, and the index hole (not shown) of the disk receives the drive pin 62 so that the disk (the recording medium) is correctly positioned with regard to the rotor 60.

Figure 18:
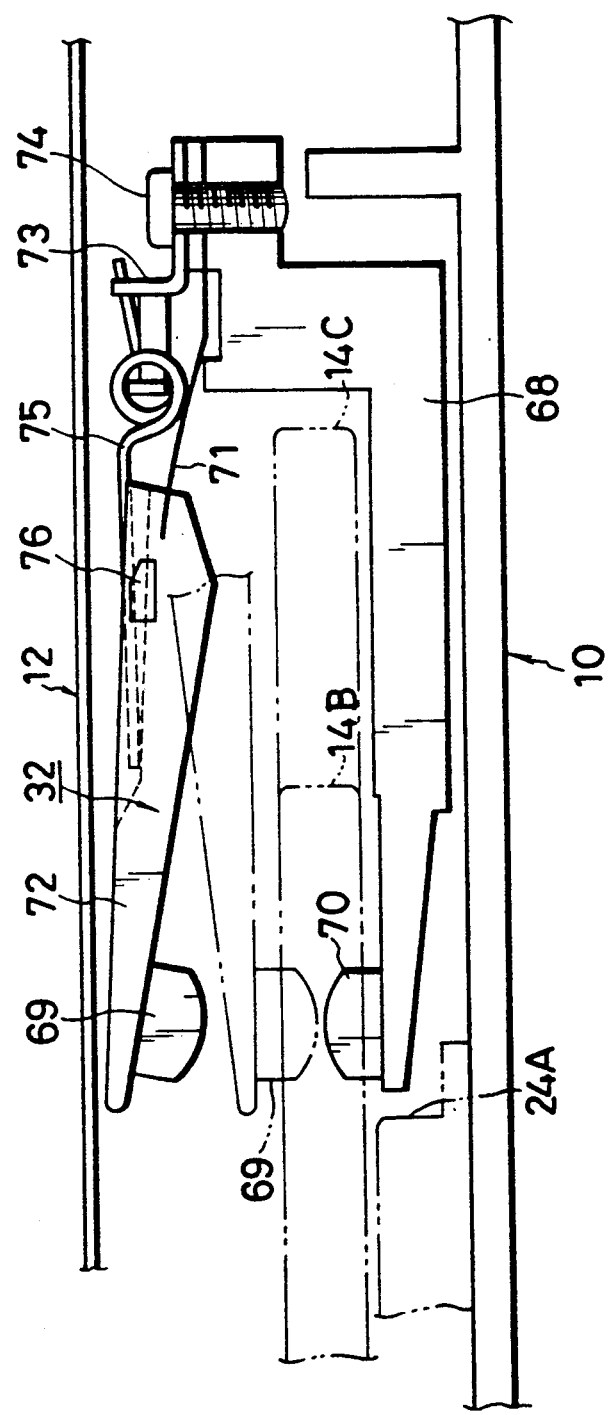
FIG. 18 is a side view showing the construction of the head unit of FIG. 4.

FIG. 18 is a side view showing the construction of the head unit 32 (see FIG. 4 or FIG. 13). In FIG. 18, various component parts of the head unit 32 are mounted on a carriage 68. In addition, an upper head 69 and a lower head 70 are provided on the carriage 68. The upper head 69 performs writing of data into and reading of data from the upper tracks of the disk, and the lower head 70 performs writing of data into and reading of data from the lower tracks of the disk. The head unit 32 (or the carriage 68) extends in the radial direction of the disk by a predetermined length so that the heads 69 and 70 can achieve writing data into and reading data from the tracks. The lower head 70 is attached on the front end portion of the carriage 68.

On the other hand, the upper head 69 is arranged so as to be raised or lowered with regard to the carriage 68. More specifically, the upper head 69 is attached to a head arm 72. Leaf springs 71 are attached to the back end portion of head arm 72. An end of each leaf spring 71 is fixed to the carriage 68 together with a supporting member 73 with an attaching screw 74. With this arrangement, the carriage 68 can support the head arm 72 via the leaf springs 71 in such a manner that the head arm 72 can move up or down. A head loading spring 75 is attached to the supporting member 73. The head loading spring 75 sets the head 69 in the loaded state by forcing the head arm 72 downward to the disk so that the head 69 makes contact with or approaches the disk to make writing or reading possible. At one or both sides of the head arm 72, there is provided a lifter or lifters 76 which engage the cover 20A (shown in FIG. 4) on the cassette guide 20. With this arrangement, when the cassette guide 20 is raised, the head arm 72 is also raised, and thus the head 69 is raised (i.e., unloaded). In the example shown in FIG. 18, the head arm 72 is supported by leaf springs 71 of a considerable length in such a manner that the head arm 72 can move up and down, and the lifter 76 is placed closer to the leaf springs 71 than to the point of action of the head loading spring 75. Thus, a moment of force is produced in such a way that the head arm 72 is forced to lower its front end (counterclockwise in FIG. 18) in the course of head raising (during unloading of the head). As a result, the front end of the head arm 72 is lowered by the bending action of the leaf springs 71 so that the top position of the head arm 72 is lowered.

Incidentally, the phantom lines 14B and 14C in FIG. 18 represent different positions of the disk cassette 14 with respect to the head unit 32. The phantom lines 24A indicate the position of the disk drive motor 24 relative to the head unit 32 when the head unit 32 advances to the innermost depth. The seek operation of the head unit 32 is carried out by moving the carriage 68 in the radial direction of the disk with the motor 34.

Figure 19:
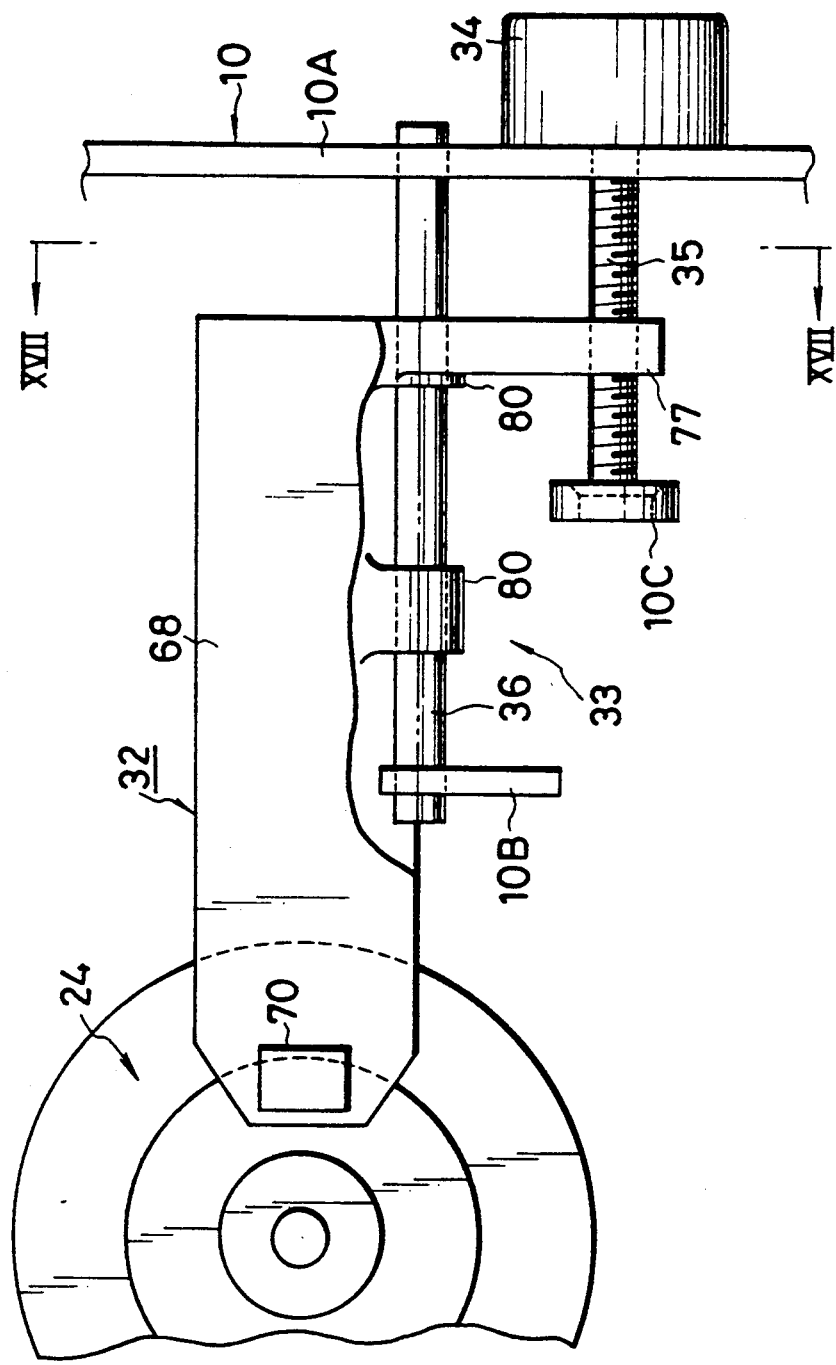
FIG. 19 is a partial plan view showing the relationship between the head unit and the head seek mechanism.
Figure 20:
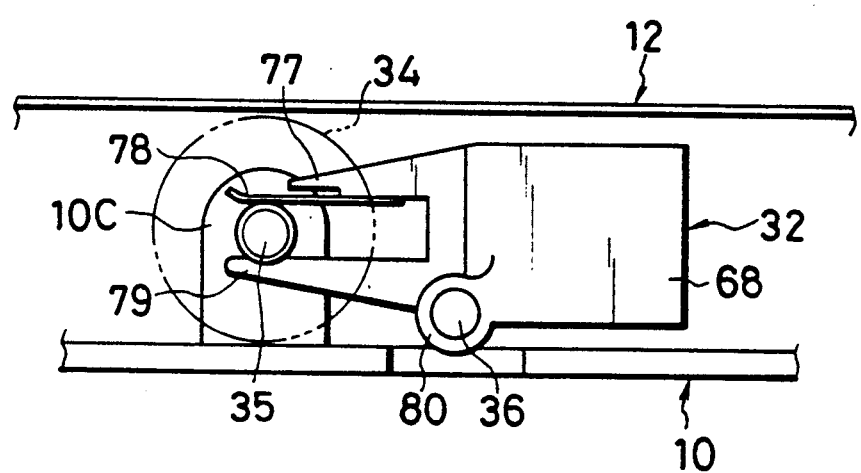
FIG. 20 is a transverse sectional view taken along the line XVII—XVII of FIG. 19.

FIG. 19 is a partial plan view showing the relationship between the head unit 32 and the head seek means 33 with the head arm 72 and the upper head 69 in FIG. 18 removed, and FIG. 20 is a transverse sectional view taken along the line XVII—XVII of FIG. 19. In FIGS. 19 and 20, the head seek motor (a stepper motor, for example) 34 is mounted on an upright plate 10A on the base 10, and the output shaft thereof, namely, a screw shaft 35, is rotatably supported at the ends thereof by the upright plate 10A and an upright plate 10C. In addition, a guide bar 36, which guides the carriage 68 during the seek operation, is supported at the ends thereof in the radial direction by the upright plate 10A and another upright plate 10B.

As shown in FIG. 20, under a projection 77 of the carriage 68, a leaf spring 78 is attached in such a manner that it is pressed to the screw shaft 35. A needle pin 79 is fastened to the carriage 68. The needle pin 79 extends in a lateral direction, and fits in a screw thread under the screw shaft 35. The carriage 68 has bearings 80 at two positions. The bearings 80 slidably fit the guide bar 36 so that the carriage 68 can move along the guide bar 36.

With this arrangement, when the screw shaft 35 is rotated by the motor 35, the head unit 32 and the carriage 68 move in the radial direction of the disk via the needle pin 79, thereby performing the seek operation so as to place the heads 69 and 70 on the desired tracks. Next, some examples of arrangements for reducing the width of the disk drive explained above will be described.

FIRST EXAMPLE

Figure 21:
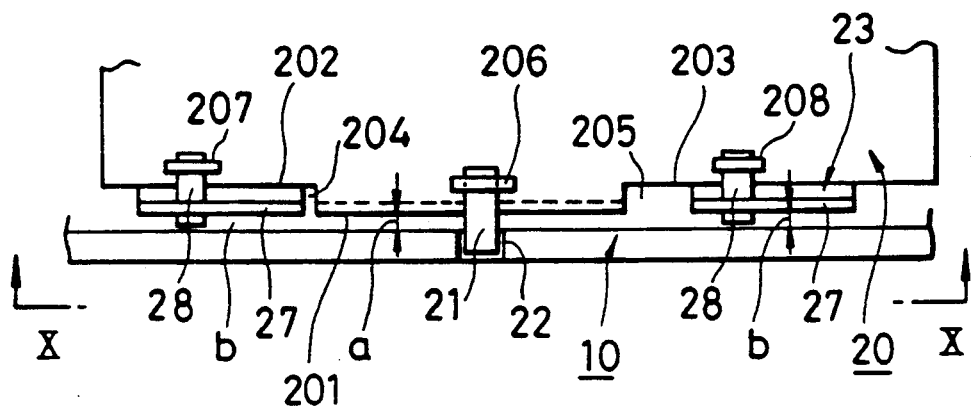
FIG. 21 is a plan view showing part of a disk drive of the first embodiment of the present invention.
Figure 22:
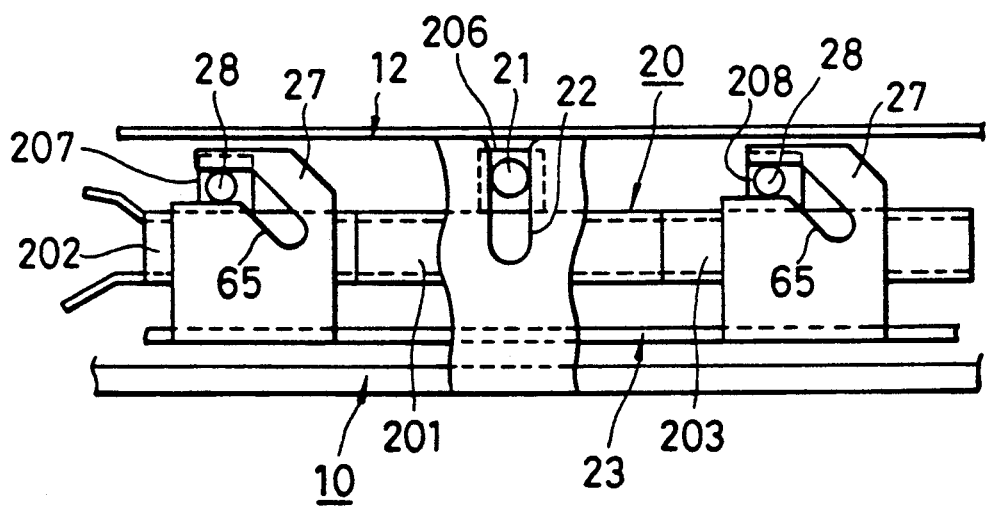
FIG. 22 is a partial side view taken along the line X—X of FIG. 21.

FIG. 21 is a plan view showing part of the disk drive, and FIG. 22 is a view showing part of a side, the view being taken along the line X—X of FIG. 21. FIG. 21 particularly shows parts of FIGS. 4 and 13.

In FIGS. 21 and 22, a gap of width a is provided between a side wall portion 201 at the middle region in the longitudinal (back and forth) direction of the cassette guide 20 and a side wall of the base 10. At the front and back of side wall portion 201, that is, at side wall portions 202 and 203 opposite to the respective upright portions 27 of the slide plate 23, the gap is widened so as to form accepting spaces 204 and 205 which can accept the upright portions 27 and which allow relative movement of the upright portions in the longitudinal direction.

The upright portions 27 of the slide plate 23 vertically extend upward above the cassette guide 20 in the spaces 204 and 205. Thus, gaps of width b are provided between the upright portions 27 and the base 10. The gaps b are approximately equal to the gap a (about 0.2-2.0 mm) at the side of the cassette guide 20.

In addition, cam slots 65 are formed near the top end of each upright portion 27. Corresponding to these slots 65, upright portions 207 and 208 are formed at portions corresponding to the side wall portions 202 and 203 on the cassette guide 20. Cam pins 28 which fit into the cam slots 25 are attached to the upright portions 207 and 208. The vertical position of each cam pin 28 is set above the disk cassette 14 held in the cassette guide 20.

Furthermore, an upright portion 206 projecting upward is formed on the cassette guide 20 at a position corresponding to the side wall portion 201. On the upright portion 206, a guide pin 21 is provided. The guide pin 21 projects to the side and engages the vertical slot 22 formed in the side wall of the base 10. Incidentally, although the above explanation is given about one side of the base 10, the cassette guide 20 and the slide plate 23, the other side of these members is formed symmetrically, As is clear from the above explanation, the outer surface of the side wall portion 201 of the cassette guide 20 is approximately coplanar with the outer surface of the upright portions 27 of the slide plate 23, in each of which a cam slot 65 is formed.

In addition, the cam mechanism for raising or lowering the cassette guide 20 is provide above the disk cassette 14 in the cassette guide 20.

According to the first arrangement, the width of the disk drive can be reduced by an amount equal to or nearly equal to the thickness of the total sum of both side walls of either the cassette guide 20 or the slide plate 23, which makes it possible to reduce the size and weight of the disk drive.

Furthermore, since the cam mechanism provided at both sides of the cassette guide 20 and the slide plate 23 for raising and lowering the cassette guide 20 is provided above the disk cassette 14, interference between the cam mechanism and the cassette guide 20 can be eliminated, which permits a further reduction in the width and weight of the disk drive.

SECOND EXAMPLE

Figure 23:
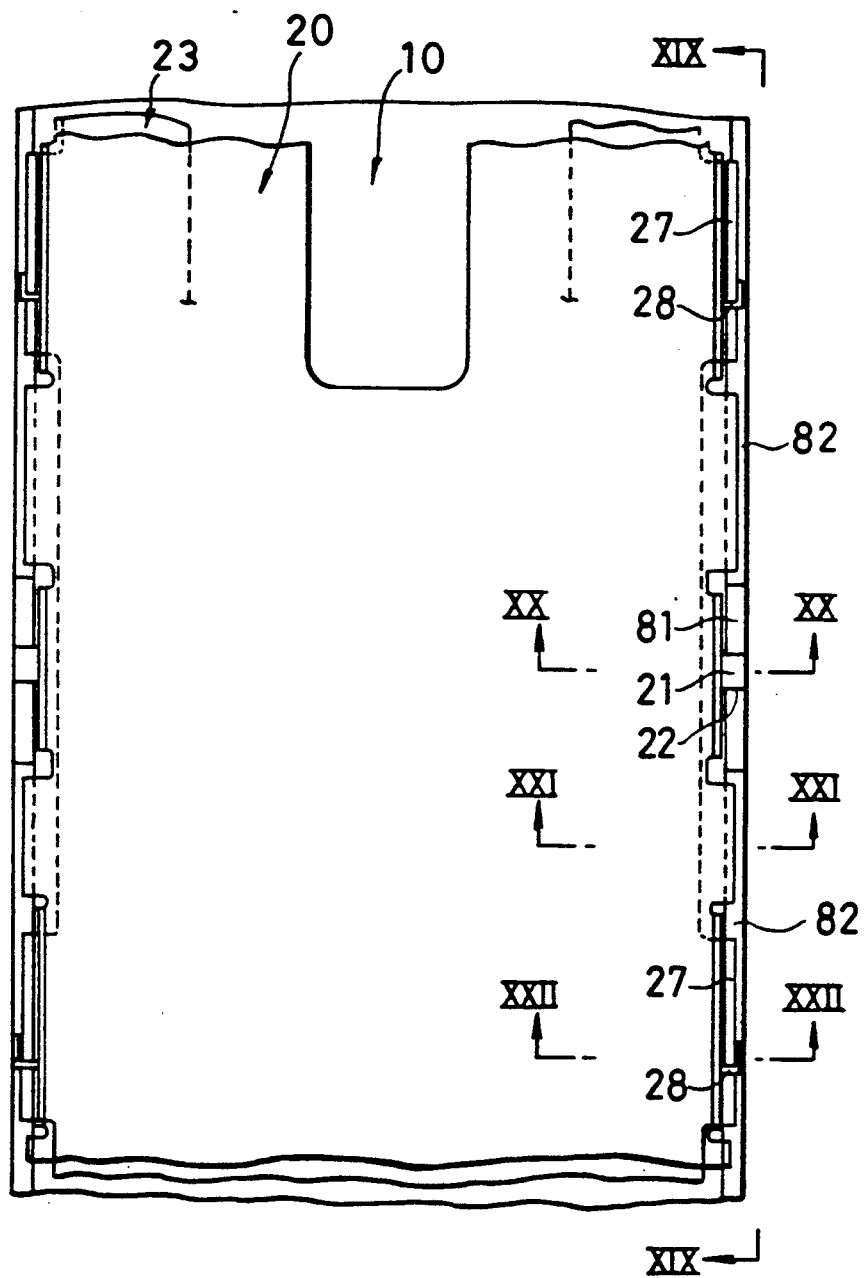
FIG. 23 is a plan view showing a disk drive of the second embodiment of the present invention.
Figure 24:
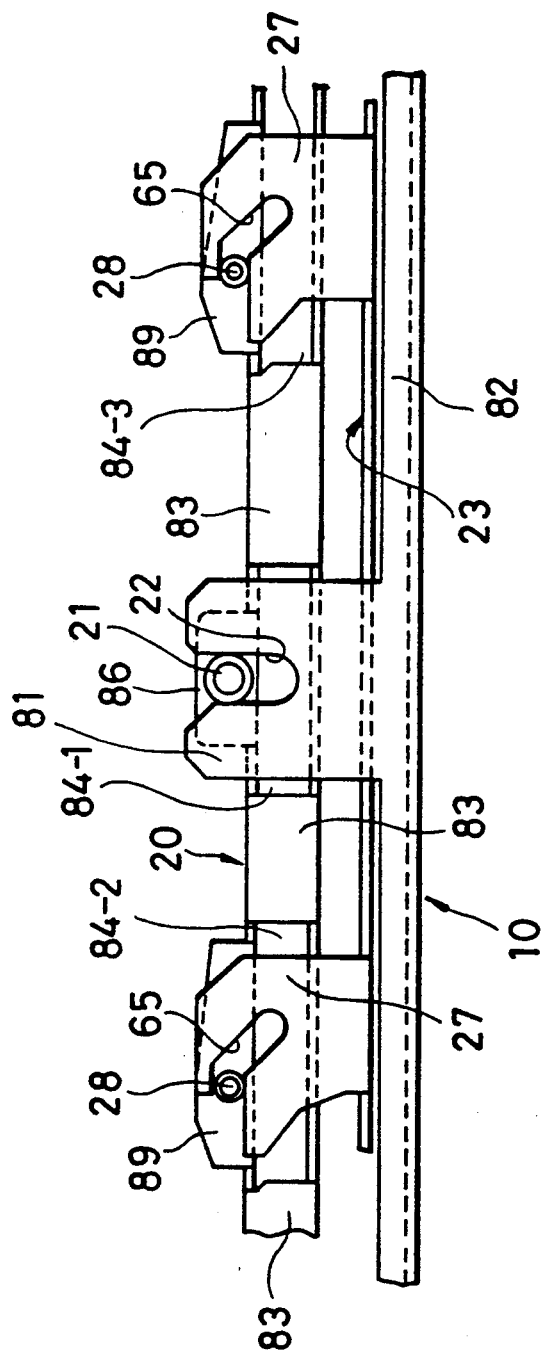
FIG. 24 is a side view taken along the line XIX—XIX in FIG. 23.
Figure 25:
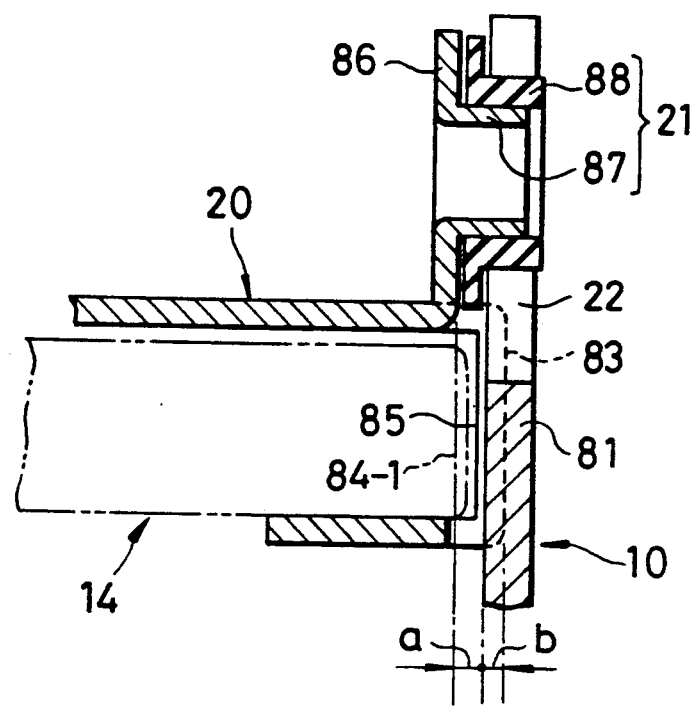
FIG. 25 is a sectional view taken along the line XX—XX in FIG. 23.
Figure 26:
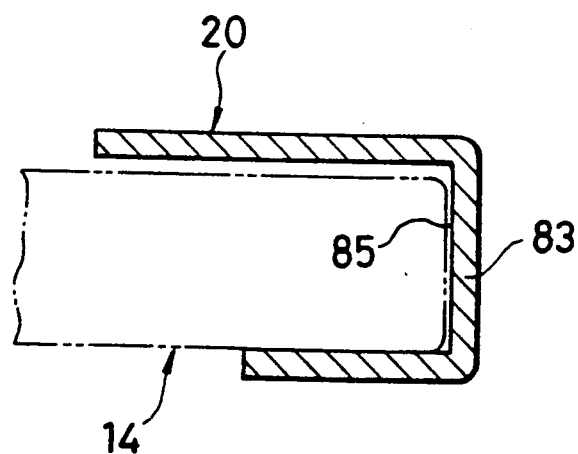
FIG. 26 is a sectional view taken along the line XXI—XXI in FIG. 23.
Figure 27:
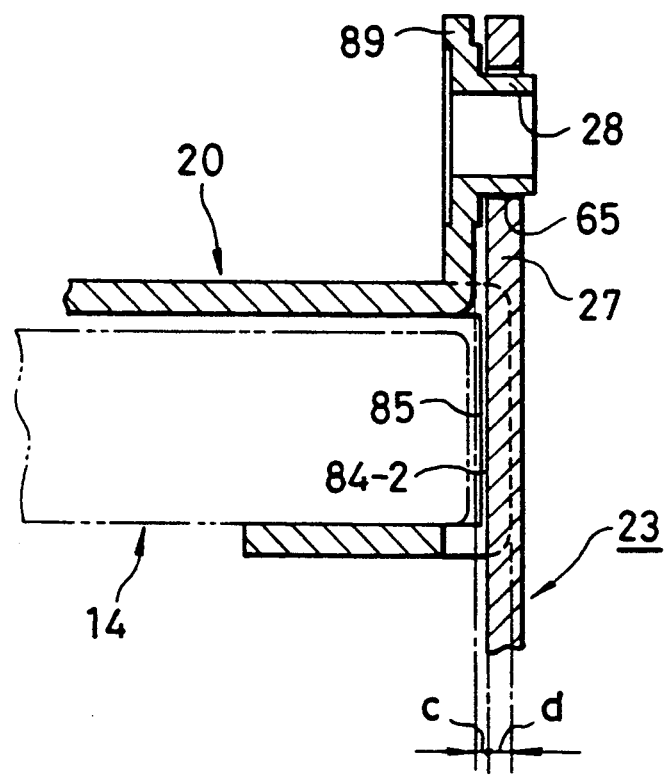
FIG. 27 is a sectional view taken along the line XXII—XXII in FIG. 23.

FIG. 23 is a plan view showing another arrangement, different from that shown in FIGS. 21 and 22. FIG. 24 is a side view taken along the line XIX—XIX in FIG. 23, FIG. 25 is a sectional view taken along the line XX—XX in FIG. 23, FIG. 26 is a sectional view taken along the line XXI—XXI in FIG. 23, and FIG. 27 is a sectional view taken along the line XXII—XXII in FIG. 23. In FIGS. 23-27, side walls 81 (FIG. 24) are formed on both sides of the base 10. Each side wall 81 has a vertical slot 22 and low ribs 82 (FIG. 24). In side walls 83 (FIG. 24) of the cassette guide 20, notched openings 84-1, 84-2, and 84-3 are formed at positions corresponding to the side wall 81 of the base 10 and to the two upright portions 27 of the slide plate 23 so as to avoid interference between the side walls 83 and the side wall 81 and upright portions 27. These side walls 83 and notched openings 84, are formed symmetrically at the opposite sides of the base 10. The inner surface 85 of each side wall 83 of the cassette guide 20 guides an edge of the disk cassette 14 housed in the cassette guide as shown in FIGS. 25-27.

In FIG. 25, the notched opening 84-1 of the cassette guide 20 has an end positioned inside by a distance a from the inner surface of the side wall 81 of the base 10. In addition, the side wall 83 of the cassette guide 20 and the side wall 81 of the base 10, which are formed in such a manner that they are free from interference, are disposed to overlap by an amount b in the left-to-right direction in FIG. 25. More specifically, the width of the cassette guide 20 (i.e., the distance between the outer surfaces of the two opposite side walls 83) is made greater than the distance between the inner surfaces of the opposite side walls 81 of the base 10 by an amount 2b; the depth of the notched opening 84-1 is set at (a+b); and hence the width of this portion of the cassette guide 20 is made smaller than the full width of the cassette guide 20 by an amount 2(a+b). Such construction enables the outer surface of each side wall 81 of the base 10 to be approximately coplanar with the outer surface of each side wall 83 of the cassette guide 20.

In FIG. 25, an upright portion 86 is formed on top of the cassette guide 20 at a position corresponding to the notched opening 84-1. A projecting portion 87 facing outside is formed on the upright portion 86. The projecting portion 87 has a cylindrical sliding member 88 which is mounted on the portion 87 by pressure insertion or the like, and is slidably fitted in the vertical slot 22 of the base 10. A bushing made of a low friction material with good wear resistance such as polyamides (nylon) or polytetrafluoroethylene (Teflon) is used as the sliding member 86. The position of the outer surface of the upright portion 86 in the left-to-right direction in FIG. 25 is approximately identical to the position of the end surface of the notched opening 84-1. The before mentioned guide pin 21 for guiding the up-and-down movement of the cassette guide 20 is composed of the projecting portion 87 and the sliding member 88 in this embodiment. FIG. 26 is a sectional view partially illustrating the disk cassette 14 guided by the portions at which the side walls 83 are formed and the inner surfaces 85 of the side walls 83.

In FIG. 27, the notched opening 84-2 of the cassette guide 20 has an end positioned inside by a distance c from the inner surface of the upright portion 27 of the slide plate 23. In addition, the side wall 83 of the cassette guide 20 and the upright portion (side wall) 27 of the slide plate 23, which are formed in such a manner that they are free from interference, overlap by an amount d in the left-to-right direction in FIG. 27. More specifically, the full width of the cassette guide 20 (i.e., the distance between the outer surfaces of the two opposite side walls 83) is made greater than the distance between the inner surfaces of the opposite side walls (upright portions) 27 of the slide plate 23 by am amount 2d; the depth of the notched opening 84-2 is set at (c +d); and hence the width of this portion of the cassette guide 20 is made smaller than the full width of the cassette guide 20 by an amount 2(c+d). Such construction enables the outer surface of each side wall (upright portion) 27 of the slide plate 23 to be approximately coplanar with the outer surface of each side wall 83 of the cassette guide 20.

In FIG. 27, an upright portion 89 is formed on top of the cassette guide 20 at a position corresponding to the notched opening 84-2 (84-3). A projecting portion facing outside is formed on upright portion 89 to constitute the cam pin 28. The cam pin 28 is slidably fitted in the cam slot 65 formed in the upright portion 27 of the slide plate 23, and makes the cassette guide move up and down in response to the back-and-forth movement of the slide plate 23. The position of the outer surface of the upright portion 89 in the left-to--right direction in FIG. 27 is approximately identical to the position of the end surface of the notched opening 84-2 (84-3).

The second embodiment described above is arranged in such a manner that the outer surfaces of the side walls 81, 83 and 27 lie in the same plane. The side walls 81 are those of the base 10, which serves as a case for installing the components of the disk drive. The side walls 83 are those of the cassette guide 20 for loading and guiding the disk cassette 14. The side walls 27 are those of the slide plate 23 for raising and lowering the cassette guide 20. As a result, the dimensions of the disk drive can be reduced by the amount of overlapping of those side walls in the lateral direction, thereby permitting the size and weight of the disk drive to be reduced.

The side walls 83 of the cassette guide 20 form the inner surfaces 85 for guiding the insertion, ejection, loading and unloading of the disk cassette 14. The side walls 27 of the slide plate 23 form the side edge upright portions having cam slots 65 for raising and lowering the cassette guide 20. Furthermore the outer surfaces of these side walls 83 and 27 are made coplanar with the outer surface of the side walls 81 of the base 10. As a result, the full width of the base 10 can be restricted to a minimum relative to the width of the disk cassette 14 regardless of the thickness of each of the side walls 81, 83 and 89.

In addition, the cam mechanisms 28 and 65 for raising and lowering the cassette guide 20 are positioned above the disk cassette 14 housed in the cassette guide 20. Furthermore the guide mechanisms 21 and 22 for guiding the up-and-down movement of the cassette guide 20 are disposed above the disk cassette 14. As a result, the full width of the disk drive can be reduced more easily.

The present invention has been described in detail with respect to the preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disk drive for recording data to and/or reproducing data from a disk comprising:
   a guide member for supporting said disk during installation or removal of said disk to or from said disk drive; and
   a slide member having an engage portion which engages said guide member so as to move said guide member in response to the installation or the removal of said disk, with said engage portion being disposed in a concave portion formed at a side wall of said guide member;
   wherein an outer surface of a the side wall of said guide member is substantially coplanar with an outer surface of side wall of said slide member.

2. A disk drive as claimed in claim 1, wherein, by said installation, said disk is loaded on a rotating means for rotating the disk.

3. A disk drive as claimed in claim 2, wherein said engage portion is an upright plate which is formed at a side end portion of said slide plate, said upright plate having a cam slot for receiving a pin provided at said guide member.

4. A disk drive for recording data to and/or reproducing data from a disk comprising:
   a guide member for supporting said disk during installation or removal of said disk to or from said disk drive;
   a slide member having an engage portion which engages said guide member so as to move said guide member in response to the installation or the removal of said disk, with said engage portion being disposed in a concave portion formed at a side wall of said guide member; and
   a case member having a side portion which is disposed in a concave portion formed at a side wall of said guide member.

5. A disk drive as claimed in claim 4, wherein, by said installation, said disk is loaded on a rotating means for rotating the disk.

6. A disk drive as claimed in claim 5, wherein said engage portion is an upright plate which is formed at a side end portion of said slide plate, said upright plate having a cam slot for receiving a pin provided at said guide member.

7. A disk drive for recording data to and/or reproducing data from a disk comprising:
   a base having left and right side plates with vertical slots, said slots having top ends and being open at the top ends;
   a guide member for supporting said disk during installation or removal of said disk to or from said disk drive, said guide member being movably guided in the vertical direction by said slots in said side plates; and
   a slide member having engage portions at both sides thereof, said engage portions engaging said guide member so as to remove said guide member in response to the installation or the removal of said disk, with said engage portions engaging said guide member at a top portion of said guide member,
   wherein said base, guide member, and slide member are configured so that they can be assembled by placing said guide member on said base in a vertical direction, in such a manner that said guide member is engaged in said slots of said side plates and engaged with said engage portions.

8. A disk drive as claimed in claim 7, wherein said engage portions are upright plates which are formed at side end portions of said slide plate, each engage portion having an upper portion with a cam slot for receiving a pin provided at a top of said guide member.

9. A disk drive as claimed in claim 1, wherein said engage portion engages said guide member at an upper portion of said guide member.

10. A disk drive as claimed in claim 4, wherein said engage portion engages said guide member at an upper portion of said guide member.

11. A cassette loading device comprising:
   (A) a base plate having a bottom plate and side plates which are formed on the right and the left side of said bottom plate, respectively;
   (B) a cassette guide being supported by said side plates so that said cassette guide can be moved between an upper position at which a cassette can be installed or removed and a lower position as a loading position at which the cassette is loaded; and
   (C) a slide member being slidably mounted to said base plate, having engage portions on each of which an engage slope engaging a pin disposed on a side face of said cassette guide is formed, said slide member being provided for moving said cassette guide between said upper position and said lower position by transmitting a slide movement of said slide member to said cassette guide through said engage slope;
   wherein said engage portions of said slide member are disposed in openings formed on said side plates of said base plate in a manner that each of said engage portions is disposed within a thickness of said side plates, so that outer surfaces of said slide member are substantially coplanar with outer surfaces of said side plates of said base plate, respectively.

12. A cassette loading device as claimed in claim 11, wherein said cassette guide has guide pins on the right and the left side faces thereof, said guide pins engaging slots which elongate vertically in said side plates of said base plate, respectively.

13. A cassette loading device as claimed in claim 12, wherein two of said pins of said cassette guide are provided on two portions of respective side faces of said cassette guide, and said guide pin is provided between said two of said pins.

14. A cassette loading device as claimed in claim 13, wherein said guide pin is provided with a roller which can rotate about said guide pin.

15. A cassette loading device as claimed in claim 11, further comprising:
- a spindle being provided on said bottom plate of said base plate, being connected to a recording medium in said cassette which is moved to said loading position with said cassette guide, provided for driving the recording medium;
- a head contacting the recording medium in said cassette which is moved to said loading position with said cassette guide, and provided for performing recording or reproducing; and
- a shutter opening member being provided in said cassette guide, provided for engaging a shutter of the cassette in said cassette guide so as to open said shutter so that the recording medium can be exposed.

16. A cassette loading device comprising:
(A) a base plate having a bottom plate and side plates which are formed on the right and the left side of said bottom plate, respectively;
(B) a cassette guide being supported by said side plates so that said cassette guide can be moved between an upper position at which a cassette can be installed or removed and a lower position as a loading position at which the cassette is loaded; and
(C) a slide member being slidably mounted to said base plate, having engage portions on each of which an engage slope engaging a pin disposed on a side face of said cassette guide is formed, said slide member being provided for moving said cassette guide between said upper position and said lower position by transmitting a slide movement of said slide member to said cassette guide through said engage slope;
wherein at least parts of the side face of said cassette guide are disposed in notched openings formed on said side plates of said face plate in a manner that each of said parts of the side face is disposed within a thickness of said side plates.

17. A cassette loading device as claimed in claim 16, wherein said cassette guide has guide pins on the right and the left side faces thereof, said guide pins engaging slots which elongate vertically in said side plates of said base plate respectively, two of said pins of said cassette guide are provided on two portions of respective side faces of said cassette guide, and said guide pin is provided between said two of said pins.

18. A cassette loading device as claimed in claim 17, wherein said guide pin is provided with a roller which can rotate about said guide pin.

19. A cassette loading device as claimed in claim 16, further comprising:
- a spindle being provided on said bottom plate of said base plate, being connected to a recording medium in said cassette which is moved to said loading position with said cassette guide, provided for driving the recording medium;
- a head contacting the recording medium in said cassette which is moved to said loading position with said cassette guide, and provided for performing recording or reproducing; and
- a shutter opening member being provided in said cassette guide, provided for engaging a shutter of the cassette in said cassette guide so as to open said shutter so that the recording medium can be exposed.

20. A cassette loading device comprising:
(A) a base plate having a bottom plate and side plates which are formed on the right and the left side of said bottom plate, respectively;
(B) a cassette guide being supported by said side plates so that said cassette guide can be moved between an upper position at which a cassette can be installed or removed and a lower position as a loading position at which the cassette is loaded; and
(C) a slide member being slidably mounted to said base plate, having engage portions on each of which an engage slope engaging a pin disposed on a side face of said cassette guide is formed, said slide member being provided for moving said cassette guide between said upper position and said lower position by transmitting a slide movement of said slide member to said cassette guide through said engage slope;
wherein said engage portions of said slide member and parts of the side face of said cassette guide are disposed in openings formed on said side plates of said base plate in a manner that each of said engage portions and each of said parts of the side face are disposed within a thickness of said side plates, so that outer surfaces of said slide member are substantially coplanar with outer surfaces of said side plates of said base plate, respectively.

21. A cassette loading device as claimed in claim 20, wherein said cassette guide has guide pins on the right and the left side faces thereof, said guide pins engaging slots which elongate vertically in said side plates of said base plate respectively, two of said pins of said cassette guide are provided on two portions of respective side faces of said cassette guide, and said guide pin is provided between said two of said pins.

22. A cassette loading device as claimed in claim 20, further comprising:
- a spindle being provided on said bottom plate of said base plate, being connected to a recording medium in said cassette which is moved to said loading position with said cassette guide, provided for driving the recording medium;
- a head contacting the recording medium in said cassette which is moved to said loading position with said cassette guide, and provided for performing recording or reproducing; and
- a shutter opening member being provided in said cassette guide, provided for engaging a shutter of the cassette in said cassette guide so as to open said shutter so that the recording medium can be exposed.

* * * * *